United States Patent [19]

Arends et al.

[11] 4,173,161

[45] Nov. 6, 1979

[54] TRIM PRESS

[75] Inventors: Albert W. Arends, Gladwin; George L. Pickard, Beaverton, both of Mich.

[73] Assignee: Leesona Corporation, Beaverton, Mich.

[21] Appl. No.: 831,093

[22] Filed: Sep. 6, 1977

[51] Int. Cl.² ............................................. B26F 1/40
[52] U.S. Cl. ...................................... 83/278; 83/202; 83/441
[58] Field of Search ................. 83/202, 278, 441, 440, 83/440.1, 734, 737, 97

[56] References Cited

U.S. PATENT DOCUMENTS

| 3,461,760 | 8/1969 | White | 83/97 X |
| 4,005,626 | 2/1977 | Bateman | 83/278 X |

Primary Examiner—J. M. Meister
Attorney, Agent, or Firm—Learman & McCulloch

[57] ABSTRACT

A trim press for severing cup-shaped articles from a sheet of thermoplastic material in which the articles have been integrally formed as by a vacuum forming operation. A horizontally reciprocable punch is driven to sever articles positioned in a stationary die by a linkage arranged to drive the punch at a relatively slow speed during the severing operation to achieve a smooth shearing separation of the relatively soft thermoplastic material. The sheet is fed into the die in step-by-step movement through vertical sheet guides fixedly mounted in a treadle which is reciprocated with the punch at a proportionate speed. A flexible sheet guide connected between the guides in the treadle and a fixed point on the machine frame flexes to accommodate reciprocation of the treadle while continuously guiding the sheet to the guides on the treadle. Feed fingers mounted on the treadle advance the sheet to the die in step-by-step movement synchronized with the stroke of the punch.

13 Claims, 4 Drawing Figures

TRIM PRESS

BACKGROUND OF THE INVENTION

The present invention is designed to sever from a sheet of thermoplastic material cup-shaped articles which have been integrally formed at uniformly spaced intervals in the sheet. Machines of this general type are known in the prior art, however the present invention is especially directed to the solution of two problems which are almost universally present in previously known machines of this type.

In operations of the type with which the present invention is concerned, the severing operation is normally performed by first seating the cup-shaped article to be severed in a female die with the die surfaces adjacent the die cavity bearing against the back side of the sheet. A reciprocable punch is then advanced into the die cavity by passing through the sheet around the peripheral portion of the article where it is joined to the sheet. In order to feed the sheet to the die means, which is normally stationary in the machine frame, the sheet is passed through a treadle which reciprocates with the punch so that as the punch retracts, the treadle is moved forwardly with respect to the die by a distance at least as great as that by which the article projects axially from the back side of the sheet. When the next succeeding article has cleared the die face, a feed mechanism advances the sheet one step to align the article with the die and the article and sheet are seated against the die by the treadle as the punch moves forwardly in its cutting stroke.

One problem presented by the above arrangement is the fact that the sheet at some point in its path of movement to the treadle normally must pass over and be guided by some structure which is fixedly mounted on the machine frame and must then advance from this fixed point of reference to guides which are fixedly mounted upon and thus continuously movable with the reciprocating treadle. In most prior art machines, no positive guiding action is provided for the sheet during its transit between the fixed point and the moving treadle, and we believe that it is this gap in the guided path of movement of the sheet which leads to feeding problems.

Further, such machines normally must be operated at fairly high cyclic production rates. Particularly where the softer thermoplastic materials are encountered, we believe that, contrary to accepted belief, it is the rapid movement of the punch during the severing operation which causes the punch to extrude or stretch the soft material rather than cleanly severing it from the web.

The present invention is especially directed toward a driving mechanism for the punch where a punch operated at a relatively high cyclic rate is so controlled as to move relatively slowly during that portion of its cycle while it is performing the severing operation, while moving at a more rapid pace during other portions of its cycle.

SUMMARY OF THE INVENTION

In accordance with the present invention, a punch is mounted in a machine frame for horizontal reciprocation into and out of severing relationship with a stationary female die mounted upon the frame. The punch is driven in reciprocatory movement to and from the die by a flywheel rotating at constant speed which drives a drive link pivotally coupled to a pin mounted upon the flywheel and radially offset from the flywheel axis. The drive link is not, as is the usual case, coupled directly to the reciprocable punch, but is instead coupled to the punch via a toggle linkage so arranged that the velocity of the punch when near that end of its stroke adjacent the die is relatively slow as compared to the velocity of the punch near the opposite end of its reciprocable stroke.

A sheet guiding treadle is coupled to the punch for horizontal reciprocation with the punch and carries a series of vertical sheet guiding strips which move with the treadle. Opposed pairs of the strips engage opposite sides of the sheet of material so that the vertically disposed sheet reciprocates horizontally with the punch as is required to provide the necessary clearance of a projecting cup-shaped article from the die during the feeding operation. To guide the sheet to the sheet guiding strips on the treadle, a series of spring steel guiding strips are fixedly secured to one of each pair of guide strips on the treadle and extend from the treadle in a generally curved path to a fixed point on the machine frame. The strips are capable of flexing movement to accommodate the horizontal reciprocation of the treadle relative to that point on the machine frame to which the flexible strips are fixedly secured so that a continuous path of movement is provided by the flexible strips throughout the full range of movement of the treadle.

Other objects and features of the invention will become apparent by reference to the following specification and to the drawings.

IN THE DRAWINGS

Figure 1:
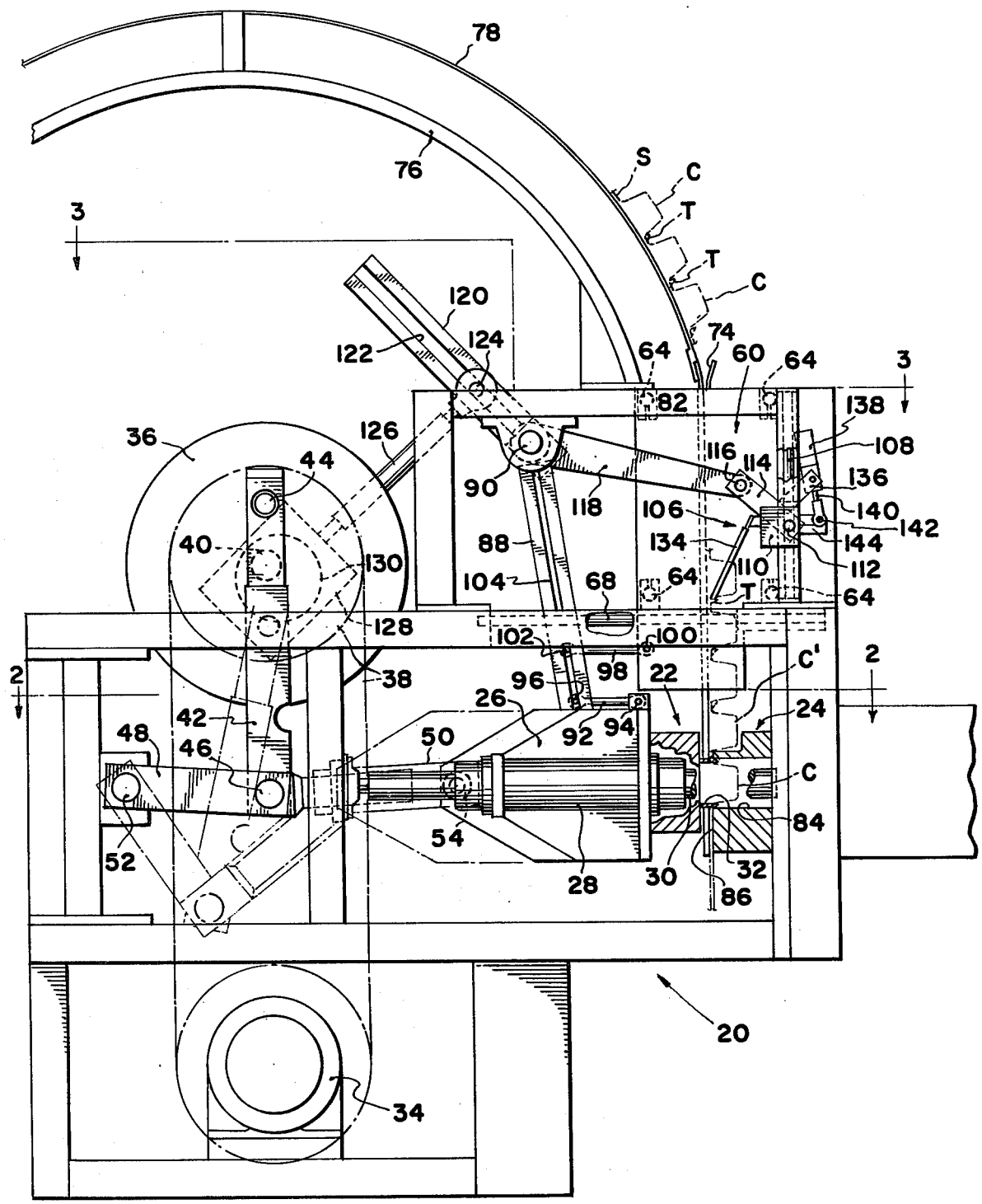
FIG. 1 is a side elevational view, with certain parts broken away, omitted or shown in section, of a trim press embodying the present invention.

The embodiment of the invention shown in the drawings is adapted to sever cup-shaped articles C from a sheet of thermoplastic material S in which the articles C are integrally formed as by a vacuum forming operation. As formed, the articles are uniformly spaced on the sheet and, to assist in the feeding operation, a series of projecting integral tabs T are formed on the sheet during the forming operation.

The apparatus includes a fixed frame designated generally 20. Severing of the articles C from the sheet S is accomplished by a reciprocating punch designated generally 22 and a stationary female die assembly 24 which is fixedly mounted upon frame 20.

Figure 2:
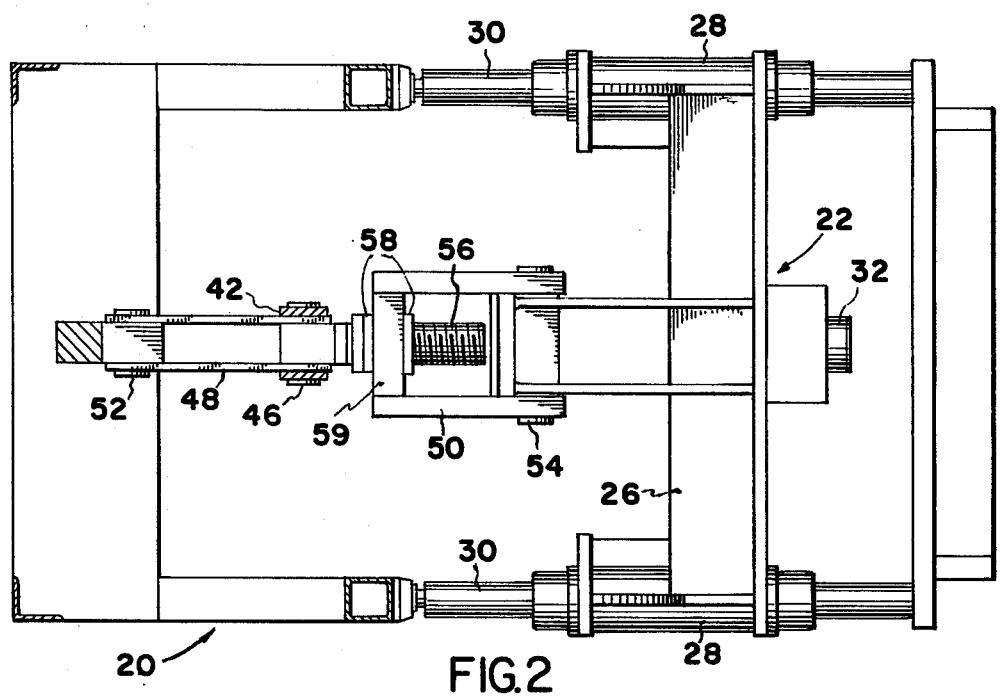
FIG. 2 is a cross sectional view taken on the line 2—2 of FIG. 1.

As best seen in FIG. 2, the punch assembly 22 includes a platen 26 having a pair of sleeves 28 which are slidably received upon horizontal guide rods 30 fixedly mounted in frame 20. Hollow tubular punches 32, of a size and shape conformed to that of the articles C to be severed from the sheet are carried upon platen 26.

Punch assembly 22 is driven in reciprocatory movement on guide rods 32 by a drive assembly which includes a main drive motor 34 fixedly mounted on the frame 20 (see FIG. 1) which drives a flywheel 36 in rotation as by a chain and sprocket drive designated generally 38.

Flywheel 36 is supported upon frame 20 by a central shaft 40 which is in turn rotatably supported from frame 20 as by fixed bearing assemblies of conventional construction, not shown. A main drive link 42 is pivotally coupled at one end to a drive pin 44 mounted on flywheel 36 in radially offset relationship to the flywheel shaft 40. At its opposite end, drive link 42 is pivotally connected, by a common pivot pin 46, to a guide link 48 and to a connecting link 50. Guide link 48 is connected to frame 20 by a pivot pin 52, while connecting link 50 is pivotally connected to punch platen 26 by a pivot pin 54.

Referring now particularly to FIG. 2, it is seen that link 50 is constructed as an extensible link, having a threaded shaft portion 56 which is connected to pivot 46 which carries a pair of nuts 58 which engage opposite sides of a cross member 59 on that portion of link 50 which is coupled to pivot 54. By locating the nuts 58 along the threaded portion of member 56, the effective length of link 50 can be adjusted.

The action of links 42, 48 and 50 in driving punch platen 26 upon rotation of flywheel 36 is such that the punch platen moves relatively slowly during its approach to and retraction from its extreme right-hand end limit of stroke as viewed in FIG. 1, and moves more rapidly near its left-hand end limit of movement as viewed in FIG. 1. The slowing down of the rate of movement of the punch as it approaches its right-hand limit of movement, where the severing action takes place, results in the punch moving rather slowly through the material as it severs the articles. This type of action is especially desirable when trimming the softer thermoplastic materials in that the slower punch speed results in a smooth cutting or knife-like severing of the plastic material as opposed to a tearing or extruding of the material which tends to take place at higher punch speeds.

Figure 4:
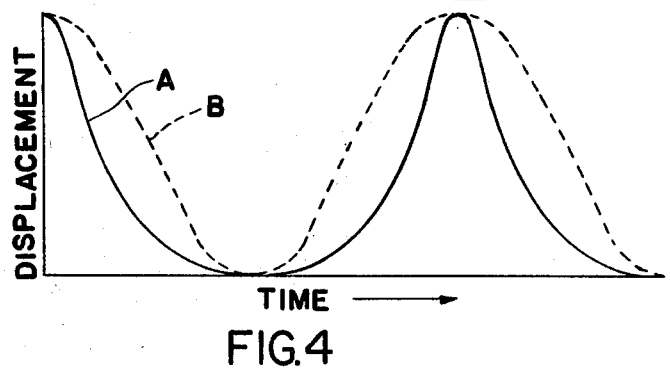
FIG. 4 is a time-displacement curve of the punch motion.

In FIG. 4, there is shown in solid line a curve A representing time-displacement curve of the punch during its reciprocatory movement with the base line or zero displacement of the curve corresponding to the position of the punch at its forward or right-hand end limit of movement as viewed in FIG. 1. The curve B of FIG. 4 is a standard sine curve which would represent a time-displacement curve of a punch motion if the flywheel 36 were mounted for rotation at the location of pivot 52 and the drive link 40 was pivotally connected directly to the punch platen. A comparison of the curves A and B of FIG. 4 shows that with the linkage arrangement as shown in FIG. 1, the curve A has relatively flat and broad valleys, representing the motion of the platen adjacent its right-hand or cutting end of stroke, and relatively sharp steep peaks showing the time-displacement plot of the punch motion near its retracted or left-hand limit of movement as viewed in FIG. 1. The velocity of the punch at any particular time is represented by the slope of the time-displacement curve and is zero where the slope or tangent to the curve at any given point is horizontal, thus it is seen that the velocity of the punch near its right-hand end of stroke is much lower than its velocity near the left-hand end of its stroke as viewed in FIG. 1.

A simplified explanation of this result is that the movement of the punch along its horizontal reciprocatory path is determined by the path of movement of the pivot 46. As best seen in FIG. 1, pivot 46 is constrained by link 48 to move along a circular arc centered about pivot 52 and extending from the full line position of pivot 46 shown in FIG. 1 to the broken line position of the pivot. Thus, when pivot 46 is at or near the full line position shown in FIG. 1 it is traveling along a portion of this arc which is substantially vertical while at the same time the pivot 44 which couples drive link 42 to the flywheel is passing along the top portion of its circular path, thus imparting only a very small component of vertical movement to drive link 42. Conversely, when pivot 46 is adjacent the broken line position shown in FIG. 1 (and the punch is adjacent its left-hand end limit) pivot 46 is on a portion of its arcuate path which has a substantial horizontal component of motion so that even the very slight change in the vertical position of pivot 44 on flywheel 36 as the pivot passes through the lower portion of its circular path will require a substantial horizontal component of movement of pivot 46 which in turn will require a substantial horizontal component of movement of the punch.

Figure 3:
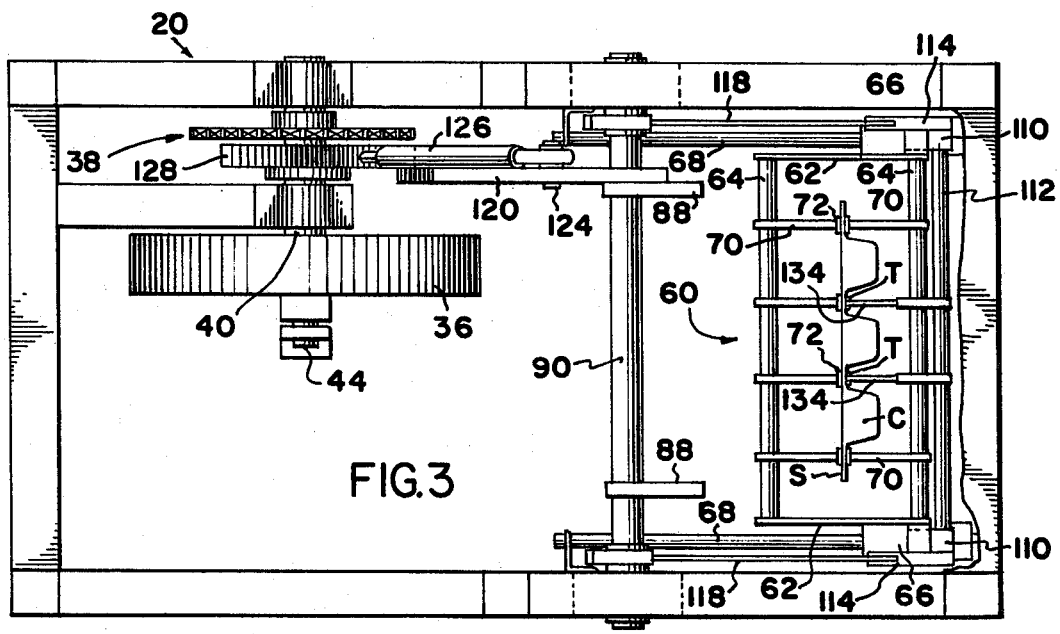
FIG. 3 is a cross sectional view taken on the line 3—3 of FIG. 1.

The sheet S and the integrally formed articles C are guided into operative relationship with punch assembly 22 and die assembly 24 by a treadle assembly designated generally 60. Referring particularly to FIG. 3, treadle assembly 60 includes a pair of spaced side plates 62 which are interconnected to each other by four transversely extending tie rods 64. Each side plate 62 has a tubular sleeve 66 fixedly mounted thereon which is slidably received and guided in horizontal rods 68 fixedly mounted on frame 20. A series of spacers 70 mounted on each of the cross frame members 64 project inwardly from the cross frame members in opposed relationship to each other to support at their inner ends a pair of spaced vertically extending guide strips 72. The opposed pairs of vertical guide strips 72 are spaced from each other by a distance slightly greater than the thickness of the sheet S to be fed which passes between and is guided by the opposed pairs of strips 72. As best seen in FIG. 3, the opposed pairs of strips 72 are spaced across treadle 60 at locations such that the projecting cup-like articles C pass between adjacent pairs of strips 72. As best seen in FIG. 1, the upper ends of strips 72 are spread apart slightly from each other as at 74 to smoothly guide the web of the sheet into the space between the guide strips.

The web of sheet material is guided to guide strips 72 by an upper guide assembly which includes a stationary fixed frame member 76 which is fixedly mounted on frame 20 and a series of curved guide members 78, each guide member 78 constituting an extension of a guide member 72. Each guide member 78 is fixedly secured to the fixed frame at a post 80 and extends from the post 80 to its associated guide member 72, the guide member 78 being fixedly secured to the guide member 72 as at 82. Guide members 78 are formed of spring steel and are capable of flexing over that portion of their extent between the fixed support 80 and the point of connection to guide member 72 at 82. Because the end of guide member 78 is fixed to a guide member 72 which in turn is fixed to the treadle assembly 60 which reciprocates horizontally on guide rods 68, the members 78 will flex as required to accommodate movement of the treadle relative to the fixed frame while at the same time providing a continuous guide to the sheet.

As best seen in FIG. 1, the sheet S is fed to the punch and die assembly with the cup-like articles C projecting from the right-hand side of the sheet as viewed in FIG. 1. Die assembly 24 is formed with a die cavity in the form of a passage 84 which extends inwardly from surface 86 of the die assembly to receive the cup-like articles when surface 86 of the die assembly bears against the sheet S. As best seen in FIG. 1, when a cup-like article C is seated within passage 84 of the die assembly, the fixed die assembly projects between the article seated in passage 84 and the next adjacent article. In order to advance the next adjacent article, designated C' in FIG. 1, upon withdrawal of the punch from the die, the treadle assembly 60 is moved to the left from the position shown in FIG. 1, carrying with it the sheet S, which is trapped between the vertically extending guide members 72, to thus shift the article C' immediately above the die in FIG. 1 to the left until the cup-like article has been moved to the left beyond vertical surface 86 of the die. When the sheet has been so positioned, a feed mechanism, to be described below, advances the sheet downwardly one step before the next return movement of the punch into shearing relationship with the die.

Reciprocatory movement of treadle 60 to accommodate the above described feeding action is accomplished by a linkage coupled between platen 26 of the punch and treadle 60. This linkage includes a coupling link 88, best seen in FIG. 1, which is pivotally mounted upon the machine frame for free pivotal movement about a shaft 90 which is in turn freely pivotal in frame 20. A first connecting link 92 is pivotally coupled to platen 26 as at 94 and pivotally coupled to link 88 as at pivot 96. A second connecting link 98 is pivotally coupled to treadle 60 as at 100 and pivotally coupled to link 88 as at 102. Preferably, link 88 is formed with an elongate slot 104 and pivotal connections 96 and 98 are so designed that pivots may be releasably clamped at selected positions of longitudinal adjustment along slot 104. It is believed apparent from FIG. 1 that upon movement of punch platen 26 to the left from the position shown in FIG. 1, link 92 will act in compression to swing link 88 in clockwise movement about shaft 90 and that this clockwise pivotal movement of link 88 will in turn be transmitted by link 98 to treadle 60 to move the treadle to the left as viewed in FIG. 1. Thus, as the punch platen 26 is driven in horizontal reciprocatory movement, treadle 60 likewise will travel in horizontal reciprocatory movement along its supporting guide rods 68 in synchronism with movement of the platen.

To advance the sheet S intermittently in synchronism with the strokes of punch assembly 22, a feed finger assembly designated generally 106 is employed. Assembly 106 includes a pair of vertical rods 108 fixedly mounted upon treadle 60 adjacent opposite sides of the treadle and which slidably receive blocks 110. A transversely extending shaft 112 is pivotally supported in and extends between blocks 110 and projects outwardly beyond the other side of each of blocks 110 to constitute a pivotal connection between blocks 110 and a pair of links 114. As best seen in FIG. 1, each of links 114 is pivotally connected at its opposite end as at 116 to an arm 118 which is fixedly secured to shaft 90 which, as described above, is freely pivotal in frame 20. An arm 120 is likewise fixed to shaft 90, the two arms 118 and 120 constituting a bellcrank which is pivotally supported on frame 20 by shaft 90.

Arm 120 is formed with a slot 122 which receives an adjustable pivot 124 coupling arm 120 to an extensible link 126. Like pivots 96 and 102, the slotted connection between pivot 124 and arm 120 enables pivot 124 to be adjustably clamped to arm 120 at any selected position of longitudinal adjustment along slot 122.

The opposite end of link 126 is connected to a block 128 which rotatably receives a disc or trapped cam 130 of circular configuration which is fixedly mounted upon flywheel 36 in eccentric relationship to flywheel shaft 40. Link 126 is normally fixed in length but may be adjustably extended to selectively establish the operating length of the link. It is believed apparent that upon rotation of the flywheel, the eccentric disc 30 will oscillate link 126 to cause pivotal oscillation of the bellcrank 118-120 about its pivot point 90. This oscillation of bellcrank 118-120 will in turn oscillate pivots 116 along an arc which extends generally vertically, centered about shaft 90, to impart a vertical component of oscillation to the pivots 116 and hence, their connected links 114 to thus vertically oscillate blocks 110 upon their guide posts 108.

The vertical motion of blocks 110 on their guide posts 108, while in part dependent upon the oscillation of arm 118, is also influenced by the fact that as arm 118 is oscillating generally vertically, the treadle 60, upon which guide rods 108 are mounted, is also being oscillated horizontally by the punch platen. Thus, referring to FIG. 1, it is seen that if platen 26 were to move to the left while arm 118 remained in the position shown, block 110 would have to move downwardly as link 114 is swung in a counterclockwise direction about pivot 116. Thus, the horizontal motion of treadle 60 modifies the vertical component of motion imparted to block 110 by the oscillation of arms 118.

With the parts in the position shown in FIG. 1, punch platen 26 is at its extreme right-hand limit of movement, while blocks 110 as shown in FIG. 1 are moving upwardly approximately at the midpoint of their vertical range of movement on rods 108.

For purposes of explanation, it may be assumed that the vertical oscillation of blocks 110 upon their guide rods 108 leads the horizontal oscillation of punch platen 26 by approximately 90° in the rotary cycle of flywheel 36.

Two or more feed fingers 134 are fixedly mounted upon the transversely extending shaft 112 carried by blocks 110 and are located transversely upon the shaft (see FIG. 3) to engage the feeding tabs T formed on the sheet S. The vertical stroke of blocks 110, and hence fingers 134, slightly exceeds the distance between adjacent feed tabs T, thus as the fingers 134 move upwardly with the blocks 110 they are carried by the blocks beyond and slightly above a feed tab T which is then engaged by the finger as the block begins its downward travel. The engagement between the fingers 134 and the tabs T during the downward travel of the block push the sheet S downwardly to advance the sheet to move the next succeeding article C' into alignment with the die cavity 84 while the platen 26 is retracted from the die a sufficient distance to permit the article to pass between the punch and die.

In order to withdraw feed fingers 134 out of engagement with the sheet S during upward movement of blocks 110, shaft 112 is supported in blocks 110 for rocking movement, and fingers 134 are clamped in position upon shaft 112. On one of blocks 110, an upwardly inclined arm 136 (FIG. 1) is fixedly mounted to pivotally support the cylinder of a reciprocating air motor 138. The piston rod 140 of the air motor is pivotally coupled as at 142 to a crank arm 144 fixedly coupled to shaft 112 so that extension or retraction of piston rod 140 rocks shaft 112 and its fixedly mounted feed fingers 134 about the axis of shaft 112.

The cylinder of motor 138 is connected in a conventional manner through a solenoid actuated four-way reversing valve to a source of air under pressure. The valve is controlled in a conventional manner by means of an electric circuit to its solenoid which includes a limit switch opened and closed at appropriate points in the operating cycle as by means of a strip cam on flywheel 36 (not shown). Because the pneumatic and electrical connections for controlling motor 138 are well known to those skilled in the art, they have not been illustrated in the drawings.

To summarize the operation of the apparatus, the stroke of punch platen 26, the horizontal stroke of treadle 60 and the vertical stroke of blocks 110 and feed fingers 134 and the synchronism or phase relationship between these various strokes is established by initial adjustment of the various components of the linkage referred to above. These adjustments include the adjustment of the length of link 50 by adjustment of the position of nuts 58 along the threaded section 56 of the link 50. The positions of pivots 96 and 102 along slots 104 in link 88 determine the length of the horizontal stroke of treadle 60 relative to the length of the stroke of punch platen 26, while the adjusted position of pivot 124 along slot 122 of link 120 determines the amplitude of the vertical stroke of blocks 110. Disc 130 is conventionally constructed in a well known manner as a multipart assembly which enables the phase angle or angular position of this cam relative to pin 44 of flywheel 36 to be adjusted to obtain the desired phase relationship between the reciprocation of punch platen 26 and vertical reciprocation of blocks 110.

With the initial adjustments set, the machine is placed in operation by starting drive motor 34 and a sheet S of material is trained over guide strips 78 and advanced downwardly between vertical guide strips 72 on treadle 60 until the feed fingers 134 can engage the feed tabs T at the leading edge of the sheet S.

The phase relationship between the vertical reciprocation of blocks 110 and the platen 26 is such that blocks 110 begin to move down from their upper limit of movement while platen 26 is moving away from die 24 in its retracting stroke. When the platen reaches the end of its retracting stroke, the feed fingers are approximately midway through their downward feeding stroke and reach their lower end limit of movement during the return or forward stroke of the platen at a point in the cycle well in advance of the arrival of the punch into shearing engagement with the sheet S.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

What is claimed is:

1. In a trim press for severing cup-shaped articles formed in synthetic plastic sheet material from the sheet, said press including a frame, die means on said frame for receiving an article integral with said sheet to locate the article relative to said frame, reciprocable punch means movable on said frame to and from said die means for severing an article located in said die means from said sheet upon the forward stroke of said punch means, drive means for driving said punch means in reciprocation, and feed means for intermittently feeding said sheet with articles formed therein to said die means in synchronism with the stroke of said punch means; the improvement wherein said feed means comprises a treadle mounted on said frame for reciprocating movement along a first path parallel to the path of movement of said reciprocable punch means, first means coupling said treadle to said punch means for coordinating the movement of said treadle with the stroke of said punch means, sheet guiding means fixedly coupled to said treadle for guiding said sheet in movement to said die means, and feed finger means for feeding said sheet to said die means in intermittent movement coordinated with the stroke of said punch means.

2. The invention defined in claim 1 further comprising sheet guide means fixedly mounted on said treadle defining a continuation of the path of feed of said sheet established by said sheet guiding means, said sheet guiding means extending from said sheet guide means to a fixed location on said frame remote from said treadle and being capable of flexing movement to continuously define a path of feed of said sheet from said fixed location to said sheet guide means throughout the full range of movement of said treadle.

3. The invention defined in claim 2 wherein said first path is a horizontal path, said sheet guide means comprises a series of spaced, opposed pairs of vertically extending guide strips fixed to said treadle and adapted to slidably receive said sheet therebetween and said sheet guiding means comprises a series of elongate flexible strips, each of said flexible strips being secured at one end to one of each of said pairs of guide strips to define a continuation thereof.

4. The invention defined in claim 3 wherein said cup-shaped articles project axially from one side of said sheet and said tredle is mounted for reciprocation above said die means, said die means having a vertical surface facing said punch means and a recess extending inwardly from said surface, said recess being adapted to receive a cup-shaped article when said surface is engaged with said one side of said sheet, said first path of said treadle extending from a first position wherein said guide strips are in substantial vertical alignment with said surface to a second position wherein said guide strips are horizontally offset from said surface by a distance greater than that by which said articles project from said one side of said sheet.

5. The invention defined in claim 3 wherein said feed finger means comprises a feed finger, mounting means mounting said finger on said treadle for vertical movement relative to said treadle, said sheet having a series of uniformly spaced feed tabs thereon, drive means for vertically reciprocating said finger on said treadle in a stroke exceeding the distance between said feed tabs, and oscillating means for intermittently oscillating said finger toward and away from said sheet to maintain said finger in engagement with a feed tab on said sheet during downward movement of said finger and to retract said finger from said sheet during upward movement of said finger.

6. The invention defined in claim 1 wherein said feed finger means comprises a feed finger, mounting means mounting said feed finger on said treadle for reciprocatory movement along a second path normal to said first path and parallel to the path of movement of said sheet to said die means, and link means coupled between said drive means, said frame and said mounting means for driving said feed finger in reciprocatory sheet feeding movement along said second path.

7. In a trim press for severing cup-shaped articles integrally formed in a sheet of relatively soft synthetic plastic material from the sheet, said press including a frame, die means on said frame having a recess for receiving an article integral with said sheet to locate the article relative to said frame, reciprocable punch means movable on said frame to and from said die means and having cutter means for severing an article located in said die means from said sheet upon movement of said punch means to the forward end of its stroke, drive means for driving said punch means in reciprocation, and feed means for intermittently feeding said sheet with articles formed therein to said die means in synchronism with the stroke of said punch means; the improvement wherein said drive means comprises flywheel means driven at a constant speed of rotation, link means coupled between said flywheel, said frame and said punch means for driving said punch means in a reciprocatory cycle wherein the speed of said punch means as it approaches the forward end of its stroke is substantially less than the speed of said punch means as it approaches the opposite end of its reciprocatory stroke, and said feed means comprises a treadle mounted on said frame for reciprocatory movement along a path generally parallel to the path of movement of said punch means, and first means coupling said treadle to said punch means for movement therewith at proportionate speeds to insert successive articles into said recess in synchronism with the stroke of said punch means.

8. The invention defined in claim 7 wherein said link means comprises a drive link, a drive pin on said flywheel at a location radially offset from the flywheel axis and pivotally coupled to one end of said drive link, a first link pivotally mounted at one end of said frame, a second link pivotally mounted at one end of said punch means, and a common pivot pivotally connecting the respective other ends of said drive, said first and said second links to each other, and means for adjustably varying the length of at least one of said links.

9. The invention defined in claim 8 wherein said first means comprises treadle link means coupled between said punch means, said frame and said treadle for transmitting a portion of the motion of said punch means to said treadle.

10. The invention defined in claim 9 further comprising means in said treadle link means for adjustably selecting the magnitude of the portion of the motion of said punch means transmitted to said treadle.

11. In a trim press for severing cup-shaped articles formed in synthetic plastic sheet material from the sheet, said press including a frame, die means on said frame for receiving an article integral with the sheet to locate the article relative to said frame, punch means mounted on said frame for reciprocatory movement along a horizontal path to and from said die means for severing an article located in said die means upon the forward stroke of said punch means, drive means for driving said punch means in reciprocatory movement, and feed means for intermittently feeding a sheet with articles formed therein to said die means in synchronism with the stroke of said punch means; the improvement wherein said feed means comprises a treadle mounted on said frame for reciprocatory movement on said frame along a path parallel to the reciprocatory path of said punch means at a location above said die means, first guide means fixedly mounted on said treadle for guiding said sheet along a vertical path extending downwardly through said treadle, and flexible second guide means for guiding said sheet from a location on said frame above said treadle along a downwardly curved path merging with said vertical path throughout the full range of movement of said treadle.

12. The invention defined in claim 11 further comprising feed finger means mounted on said treadle for cyclic movement along a closed path wherein said finger means intermittently advances said sheet downwardly through said first guide means in step-by-step movement, and link means coupled between said drive means and said finger means for driving said finger means in movement along said closed path.

13. The invention defined in claim 12 wherein said finger means comprises vertical guide means fixedly mounted on said treadle, rock shaft means mounted on said vertical guide means for guided vertical movement relative to said treadle and for oscillating rocking movement about a rock shaft axis, a feed finger fixedly mounted on said rock shaft means, pivot means coupling said rock shaft means to said link means to drive said rock shaft means in vertical reciprocation on said guide means, and oscillating means for driving said rock shaft means in rocking movement about said rock shaft axis.

* * * * *